United States Patent [19]

Kuroshita et al.

[11] Patent Number: 5,606,557
[45] Date of Patent: Feb. 25, 1997

[54] BUS LOAD DISTRIBUTING METHOD SUITABLE FOR DATA COMMUNICATIONS EQUIPMENT AND BUS SWITCHING CONTROL DEVICE FOR DATA COMMUNICATIONS EQUIPMENT

[75] Inventors: Kazumasa Kuroshita; Toshihiro Ishida; Osamu Sekihata, all of Kawasaki, Japan

[73] Assignee: Fujitsu Limited, Kanagawa, Japan

[21] Appl. No.: 599,663

[22] Filed: Feb. 9, 1996

Related U.S. Application Data

[63] Continuation of Ser. No. 298,039, Aug. 30, 1994, abandoned.

[30] Foreign Application Priority Data

Mar. 10, 1994 [JP] Japan ............................ 6-040004

[51] Int. Cl.$^6$ ........................... H04J 3/02; H04L 12/40
[52] U.S. Cl. .................................. 370/364; 370/402
[58] Field of Search ........................ 370/85.11, 85.9, 370/85.1, 67, 85.13, 85.12

[56] References Cited

U.S. PATENT DOCUMENTS

| | | | |
|---|---|---|---|
| 5,107,492 | 4/1992 | Roux et al. | 370/85.11 |
| 5,202,883 | 4/1993 | Hatherill et al. | 370/67 |
| 5,280,482 | 1/1994 | Kitamura et al. | 370/85.11 |
| 5,481,679 | 1/1996 | Higaki et al. | 395/308 |
| 5,485,591 | 1/1996 | Kuroda | 395/800 |

*Primary Examiner*—Douglas W. Olms
*Assistant Examiner*—Min Jung

[57] ABSTRACT

A bus load distributing method suitable for data communications equipment and a bus switching control device for data communications equipment. The data communication equipment includes plural buses, a bus connecting unit for interconnecting the plural buses, and a control unit for connecting physically and selectively each module to one among the plural buses. The control unit connects plural modules to a bus to recognize, distribute and reduce the load on the bus. The control device also switches a bus to be connected in accordance with the traffic of each module to optimize the bus load.

11 Claims, 12 Drawing Sheets

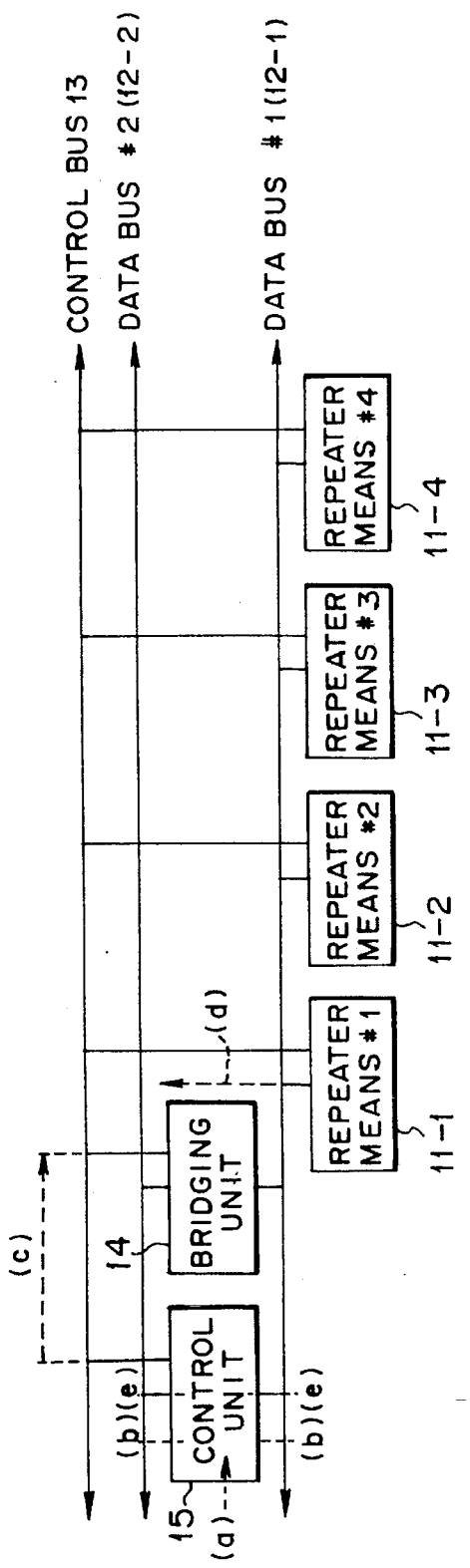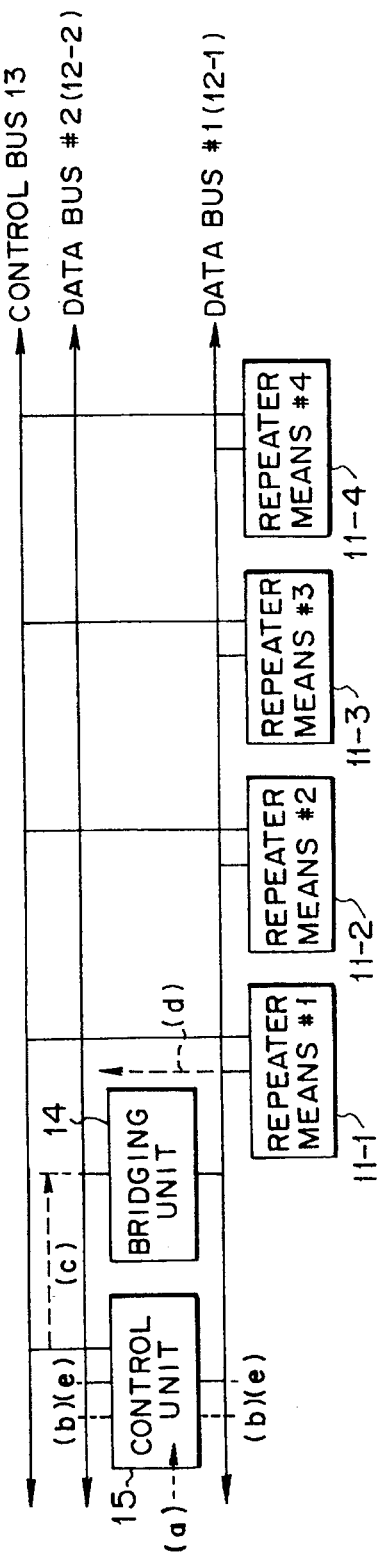

BUS LOAD DISTRIBUTING METHOD SUITABLE FOR DATA COMMUNICATIONS EQUIPMENT AND BUS SWITCHING CONTROL DEVICE FOR DATA COMMUNICATIONS EQUIPMENT

This is a continuation of application Ser. No. 08/298,039, filed Aug. 30, 1994, now abandoned.

BACKGROUND OF THE INVENTION

1. Field of the Invention

The present invention relates to a bus load distributing method for data communications equipment that connects plural modules with a bus to perform data communications between modules. The present invention also relates to a bus switching control device for data communications equipment.

Moreover, the present invention can be applied to products including bridges, routers, brouters, smart (Software Maintenance and Reproduction Tools) HUB, and the like in a local area network (LAN).

2. Description of the Related Art

Generally, data communications equipment which mutually connects plural modules with buses to perform data communications between the modules have been designed in consideration of the following requirements:

(1) To form a module acting as a unit component to create a flexible system configuration within equipment.

(2) To include plural buses within equipment to group further modules acting as unit components.

However, the unit component realized under the requirements (1) and (2) can not be used to distribute and reduce loads in the equipment.

In the equipment described above, an increased number of internal loads may cause a decrease in the performance. Generally, recognizing and reducing loads within equipment have been completely relegated to users.

SUMMARY OF THE INVENTION

The present invention is made to overcome the problems mentioned above. An object of the present invention is to provide a bus load distributing method in data communications equipment that can recognize, distribute and reduce bus loads by means of control means therein.

Another object of the present invention is to provide a bus switching control device for data communications equipment.

In order to achieve the above objects, according to the present invention, the bus load distributing method suitable for data communications equipment, the data communications equipment including plural buses, bus connecting means for interconnecting the plural buses, and control means for controlling so as to connect selectively and physically the plural modules to one among the plural buses, whereby the plural modules are connected to the plural buses, respectively, to perform data communications between the plural modules via the plural buses and to reduce the load to each of the plural buses, is characterized by the steps of switching the bus to be connected by means of the control means and in accordance with a traffic of each of the modules to minimize the load associated with the bus.

In this case, the control means counts the amount of data transmitted from each of the modules to the buses, and switches a concerned module to a bus to be connected, based on information regarding the amount of data.

The control means counts by address the amount of data transmitted from each of the modules to the buses, and switches a concerned module to a bus to be connected, based on information regarding the amount of data counted by address.

Furthermore, the bus load distributing method suitable for data communications, further including the steps of calculating roughly the traffic of each of the buses, based on the result obtained by counting the amount of data by address, the data being transmitted from each module via the bus in the data communications equipment; and minimizing the load of each of the buses, based on the result obtained by roughly calculating a traffic after a bus has been switched, whereby the control means instructs each module of a changing aspect between the bus and each module.

The bus connecting means monitors a traffic passing, informs the control means that there are a large amount of traffic between specific modules via a different bus, and changes the configuration of the modules.

Furthermore, the control means halts a bus access right of a module which is subjected to a bus changing connection, rewrites connection information regarding the bus connecting means into information after the bus connection has been changed, and connects the module to a bus established after the bus changing operation.

The module is formed as repeater means for a local area network, and the bus connecting means is formed as a bridging means for the local area network, whereby after the control means halts a bus access right of the repeater means which changes a bus connection, it transmits data to the bridging means using an upper layer, the data being used for updating the setting information of the bridging means, instead of the repeater means which changes a bus connection to the bridging means, and connects the repeater means to the bus established after the connection information for the bridging means has been changed.

According to the present invention, the bus switching control device for data communications equipment, the data communications equipment wherein plural modules are connected to a bus to perform data communications between the plural modules via the bus, the data communications equipment including a control device that connects selectively and physically each module to one among the plural buses, is characterized by bus switching control means for switching a bus to be connected in accordance with a traffic of each of the modules to optimize a load associated with the buses.

In this case, the bus switching control means includes counting means for counting the amount of data transmitted from each module to the bus, and bus switching means for switching a bus to connect a concerned module, based on data amount information from the counting means.

The bus switching control means includes counting means for counting by address the amount of data transmitted from each module via the bus; and bus switching means for switching a bus to connect a concerned module, based on the information regarding data amount counted by address using the counting means.

In this case, the bus switching control device for data communications equipment further includes trial traffic calculating means for roughly calculating a traffic on each of the buses, based on a count result from the counting means; and changing aspect instructing means for instructing each module of a changing aspect to minimize a load associated with a bus, based on a traffic result roughly calculated by the trial traffic calculating means.

The bus switching control means switches the configuration of the modules in response to information regarding that a traffic on a different bus between specific modules is heavy.

Furthermore, the bus switching control means includes access right inhibiting means for inhibiting a bus access right of a module by which a bus connection is changed, and means for connecting the module to a bus established after a switching operation, by instructing to rewrite information regarding bus connection into information established after the bus connection switching operation.

According to the present invention, plural modules are connected by way of a bus. This configuration allows the intermodule data communications equipment to select three methods: (1) an internal bus load recognizing method, (2) an optimum module-to-bus connecting method to reduce a bus load, and (3) a setting information changing method for a bus-to-bus connection unit according to the method (2). There is an advantage in that this feature allows the internal configuration or module configuration to reduce (distribute) the load of equipment. This feature also can improve the device performance and provide end users with an effective use of the band of a LAN.

According to the present invention, since a bus switching operation is performed in accordance with the traffic of each module to optimize the load of a bus, the internal configuration or module configuration can be made to reduce (distribute) the load of equipment.

According to the present invention, each module counts the amount of data transmitted to a data bus to change the bus to be connected to a module, based on the data amount. In order to connect each module with a bus with a small amount of data, a module with a large amount of communications therein or a system with a large amount of communications between modules can be detached. There is an advantage in that this approach allows the bus load to be reduced effectively.

According to the present invention, each module counts the amount of data transmitted to a data bus by destination address to change the bus to be connected to the module, based on the data amount. Similarly, in order to connect each module with a bus with a small amount of data, a module with a large amount of communications therein or a system with a large amount of communications between modules can be detached. There is an advantage in that this approach allows the bus load to be reduced effectively.

The equipment has internally a portion that roughly calculates the traffic on each bus, based on the result that each module counts the amount of data onto a bus by destination address. The traffic after the bus switching operation is roughly calculated in consideration of various possible cases where each module is connected to a bus. The control unit can instruct each module to use a changing method to minimize the bus load. This approach can reduce more effectively the bus load.

Moreover, the bus connecting unit, which connects between buses, monitors a passing traffic. When the bus connecting unit informs the control unit that a large amount traffic exists in a different bus between specific modules, the module configuration can be changed. As a result, the bus load can be effectively reduced.

When the bus access right is halted to a module to be subjected to a bus switching operation, the control unit rewrites information regarding the bus connection means into information obtained after changing a bus connection, whereby the module can be connected to the changed bus. This approach can easily define the bus changing procedure, thus contributing a reduction of the bus load.

Furthermore, with LAN repeater means acting as a module and LAN bridge means acting as bus connecting means for connecting between buses, the control means halts the bus access right of the repeater means, and transmits data for updating information regarding the setting of the bridge means to the bus connected to the bridge means, using the upper layer, instead of the repeater means. Thus the information regarding bridge means to be connected is updated, and then the control means can connect the repeater means to the switched bus. This feature allows the bus changing procedure to be easily defined, thus contributing a reduction of the bus load.

BRIEF DESCRIPTION OF THE DRAWINGS

FIG. 16 is a diagram explaining the bus switching process according to the first embodiment of the present invention; and FIG. 17 is a diagram explaining the bus switching process according to the first embodiment of the present invention.

Figure 1:
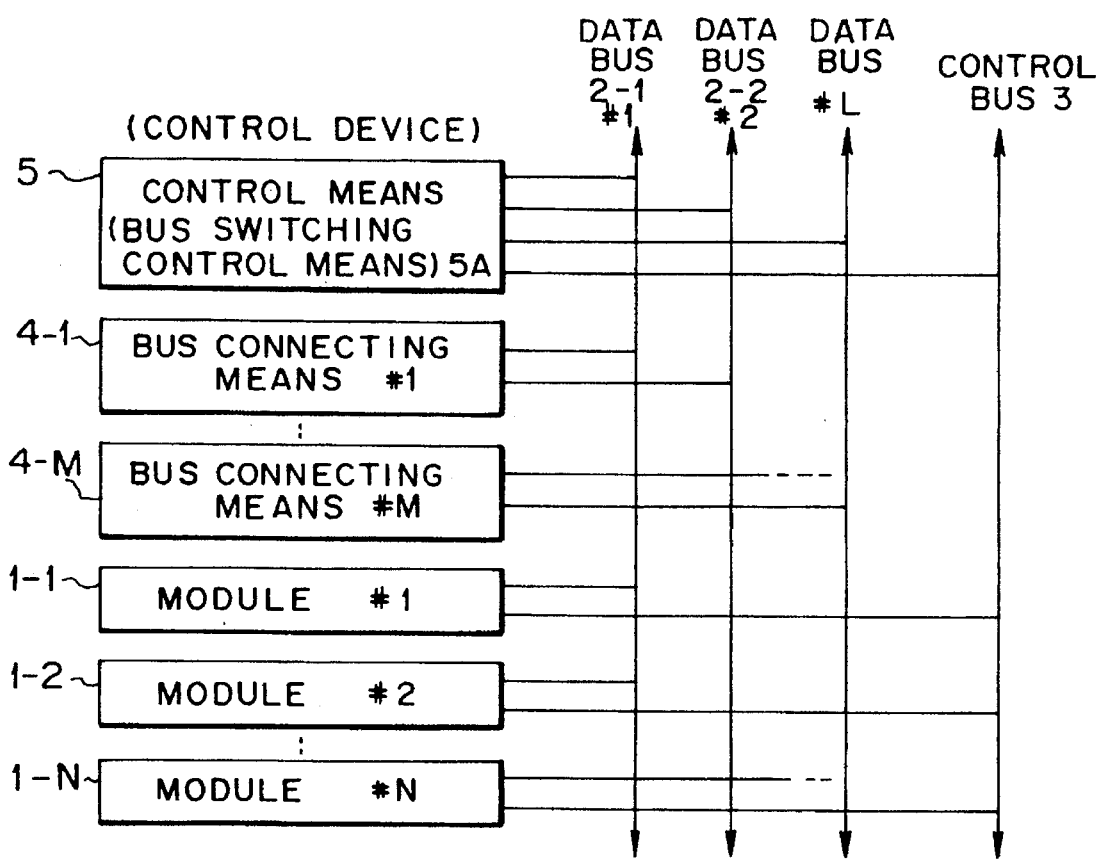
FIG. 1 is a block diagram for explaining an aspect of the present invention.

DESCRIPTION OF THE PREFERRED EMBODIMENTS (a) The aspect of the invention:

FIG. 1 is a block diagram showing an aspect of the present invention. Referring to FIG. 1, numerals 1—1 to 1-N (N is an integer of 2 and more) represent plural modules. Numerals 2-1 to 2-L (L is an integer of 2 and more) represent data bus. Plural modules 1-i, 1-j (i, j=1 to N, i≠J) are connected via data buses 2-p, 2-q (p, q=1 to L, p≠q) to perform data communications. Numeral 3 represents a control bus.

Numerals 4-1 to 4-M (M is an integer of 2 and more) represent bus connecting means for interconnecting data buses. Numeral 5 represents control means that controls so as to connect selectively and physically each module 1-i to the data bus 2-p among the plural data buses 2-1 to 2-n.

The method of the present invention includes a step in which the control bus 5 switches the data bus 2-p to be connected in accordance to the traffic of each module 1-i to optimize the load associated with the data bus 2-p.

In the control means 5, each module 1-i counts the amount of data sent to data bus 2-p, and then switches the data bus 2-p connected to the module 1-i in accordance with information regarding the data amount.

Moreover, in the control means 5, each module 1-i counts the amount of data sent to data bus 2-p by destination address, and then switches the data bus 2-p connected to the module 1-i in accordance with information regarding the data amount counted by destination address.

In the data communications equipment, each module 1-i roughly calculates the traffic on each data bus 2-p based on the count result of the amount of data sent onto the data bus 2-p by destination address, and instructs the control means 5 of a changing aspect of data bus 2-p connected to each module 1-i, based on a rough calculation of the traffic after the data bus switching operation, thus minimizing the load on the data bus 2-p.

The bus connecting means 4-k (k=1~M) monitors passing traffics, informs the control means 5 of the fact that the traffic between specific modules 1-i and 1-j via a different data bus 2-p is heavy, and then changes the module configuration.

The control means 5 halts the access right to the data bus 2-p of the module 1-i of which the bus connection is to be changed., then rewrites the connection information of the bus connecting means 4-k into information regarding that the data bus 2-q has been selected, and connects the corresponding module 1-i to the data bus 2-q switched.

With the module 1-i acting as repeater means for a LAN and the bus connecting means 4-k acting as a bridge means in a LAN, the control means 5 halts the access right to the data bus 2-p of the repeater means 1-i of which the connection to the data bus 2-p is changed. Then, the control means 5 transmits data updating the setting information to the bridge means 4-k, using the upper layer, instead of the repeater means 1-i which switches the connection to the data bus 2-p, so that the connection information for the bridge means 4-k is updated. Thereafter, the control means 5 connects the repeater means 1-i to the data bus 2-q switched.

In another viewpoint, the control means 5 is a control device that controls to connect physically and selectively each module 1-i to the data bus 2-p among the plural data buses 2-1 to 2-L in the data communications equipment. In this case, the control means 5 has the bus switching control means 5A that switches the data bus 2-p to be connected in accordance with the traffic on each module 1-i to optimize the load associated with the data bus.

The bus switching control means 5A includes counting means for counting the data amount sent to the data bus 2-p by each module 1-i, and bus switching means for switching the data bus 2-p connected to the corresponding module 1-i, based on the data amount information obtained by the counting means.

The bus switching control means 5A includes counting means for counting the data amount sent to the data bus 2-p by each module 1-i by a destination basis, and bus switching means for switching the data bus 2-p connected to the corresponding module 1-i, based on the data amount information organized by destination address and obtained by the counting means.

The bus switching control means 5A includes trial traffic calculating means for roughly calculating traffics of each data bus, based on the count result from the counting means, and changing aspect instructing means for instructing each module 1-i to minimize the load on the data bus, based on the result from the trial traffic calculating means.

The bus switching control means 5A changes the module configuration in response to information regarding that the traffic on the different data bus 2-p between the specific modules 1-i and 1-j is heavy.

The bus switching control means 5A includes access right halting means halting the access right to the data bus 2-p of the module 1-i to change the connection to the data bus 2-p, and means for connecting the corresponding module 1-i to the data bus switched, by instructing to rewrite information regarding the data bus connection into information established after the data bus switching operation.

According to the bus load distributing method in data communications equipment of the present invention, the control means 5 switches the data bus 2-p to be connected according to the traffic of each module 1-i to optimize the load on the data bus 2-p.

In the control means 5, each module 1-i counts the amount of data sent to the data bus 2-p and changes the data bus 2-p to be connected based on the information regarding the data amount.

In the control means 5, each module 1-i counts the amount of data sent to the data bus 2-p by a destination basis and changes the data bus 2-p to be connected, based on the information regarding the data amount counted by destination bases.

The control means 5 instructs each module 1-i of a changing aspect in such a manner that each module 1-i calculates roughly the traffic on each data bus 2-p, based on the count result obtained by counting the amount of data sent to the data bus 2-p by a destination basis, and minimizes the load of the data bus 2-p, based on the rough traffic calculation after the data bus has been switched.

The module configuration may be changed by monitoring the traffic passing via the bus connecting means 4-k and informing the control means 5 that the traffic on a different data bus 2-p between specific modules 1-i and 1-j is heavy.

The control means 5 may connect the module 1-i to the data bus 2-q after the changing operation by halting the access right to the data bus 2-p of the module 1-i to which the bus connection is to be changed, and rewriting the information regarding the connection of the bus connecting means 4-k into the information after changing the connection to the data bus 2-p.

With of the module 1-i acting as repeater means and bus connecting means 4-k acting as bridge means for LAN, the control means 5 updates information regarding the connection of the bridge means 4-k by halting the access right to the data bus 2-p of the repeater means 1-i and transmitting data to the bridge means 4-k to update the setting information of the bridge means 4-k using the upper layer, instead of the repeater means 1-i, thus updating the connection information of the bridge means 4-k. Then the control means 5 connects the repeater means 1-i to the data bus 2-q after the changing operation.

In the bus switching control means for data communications equipment of the present invention, the bus switching control means 5A switches the data bus 2-p to be connected based on the traffic of each module 1-i to optimize the load of the data bus.

In the bus switching control means 5A, the counting means can count the amount of data sent to the data bus 2-p by each module 1-i, and the bus switching means can switch the data bus 2-p to be connected to the module 1-i, based on the information regarding the amount of data obtained by the counting means.

In the bus switching control means 5A, the counting means can count the amount of data sent to the data bus 2-p from each module 1-i by a destination basis, and the bus switching means can switch the data bus 2-p to be connected to the module 1-i by the destination basis, based on the information regarding the amount of data obtained by the counting means.

Based on the rough traffic calculation by the trial traffic calculating means, the changing aspect instructing means can instructs each module 1-i to minimize the load of the data bus.

The bus switching control means 5A can change the module configuration when the traffic on a different bus 2-p between specific modules 1-i and 1-j is heavy.

In the bus switching control means 5A, the access right halting means halts the access right to the data bus 2-p of the module 1-i by which the connection to the data bus 2-p is changed, and then instructs to rewrite information regarding the data bus connection into information after the data bus has been changed, thus connecting the module 1-i to the changed data bus 2-q.

Hence, according to the present invention, the equipment that has plural bus modules 1-i connected to the bus 2-p to perform data communications between modules can adopt the following methods: (1) an internal bus load recognizing method, (2) an optimum module-to-bus connecting method to reduce a bus load, and (3) a setting information changing method for a bus-to-bus connection unit according to the method (2). There is an advantage in that this feature allows the internal configuration or module configuration to reduce (distribute) the load of equipment. This feature also can improve the device performance and provide end users with an effective use of the band of a LAN.

According to the present invention, since a bus to be connected is switched in accordance with the traffic of each module 1-i to optimize the bus load, an internal configuration or module configuration can be formed to reduce (distribute) the load in equipment.

Since each module 1-i counts the data on the data bus to switch the bus to be changed, it can be connected to a bus with a light traffic by separating a module with heavy internal traffic or modules with a heavy traffic between them. This feature can effectively reduce the bus load.

Like the method described above, since each module 1-i counts the data on the data bus to switch the bus to be changed by a destination basis, it can be connected to a bus with a light traffic by separating a module with heavy internal traffic or modules with a heavy traffic between them. This feature can effectively reduce the bus load.

Moreover, the equipment includes a portion that calculates roughly the traffic on each bus, based on the result obtained by counting data sent from each module 1-i to a bus by a destination basis, to calculate the traffic established after a bus changing operation under possible cases of the bus connection changing methods for each module 1-i. The control unit can instruct each module to select a most suitable changing method to minimize the bus load in accordance with the calculation result. As a result, the bus load can be further effectively reduced.

Furthermore, the bus connecting unit 4-k, that connects between buses, can monitor the passing traffic, and inform the control unit to change the module configuration when the traffic is heavy on a different bus between specific modules. Thus, the bus load can be effectively reduced.

The module 1-i can be connected to a bus after a changing operation by halting the bus access right of the module 1-i to be subjected to a bus changing operation and then rewriting the connection information of the bus connecting means 4-k into information after the bus changing operation by the control means. This feature can easily specify the bus switching procedure, thus contributing largely a reduction of bus load.

Moreover, with the module 1-i corresponding to repeater means for LAN and the bus connecting means for connecting between buses corresponding to bridge means for LAN, the control means 5 halts the bus access right of the repeater means and then transmits data for updating setting information to bridge means by using the upper layer, instead of the repeater means. Thereafter, the control means can connect the repeater means to a bus established after the changing operation. Thus, the bus switching procedure can be easily specified to reduce the bus load.

Figure 2:
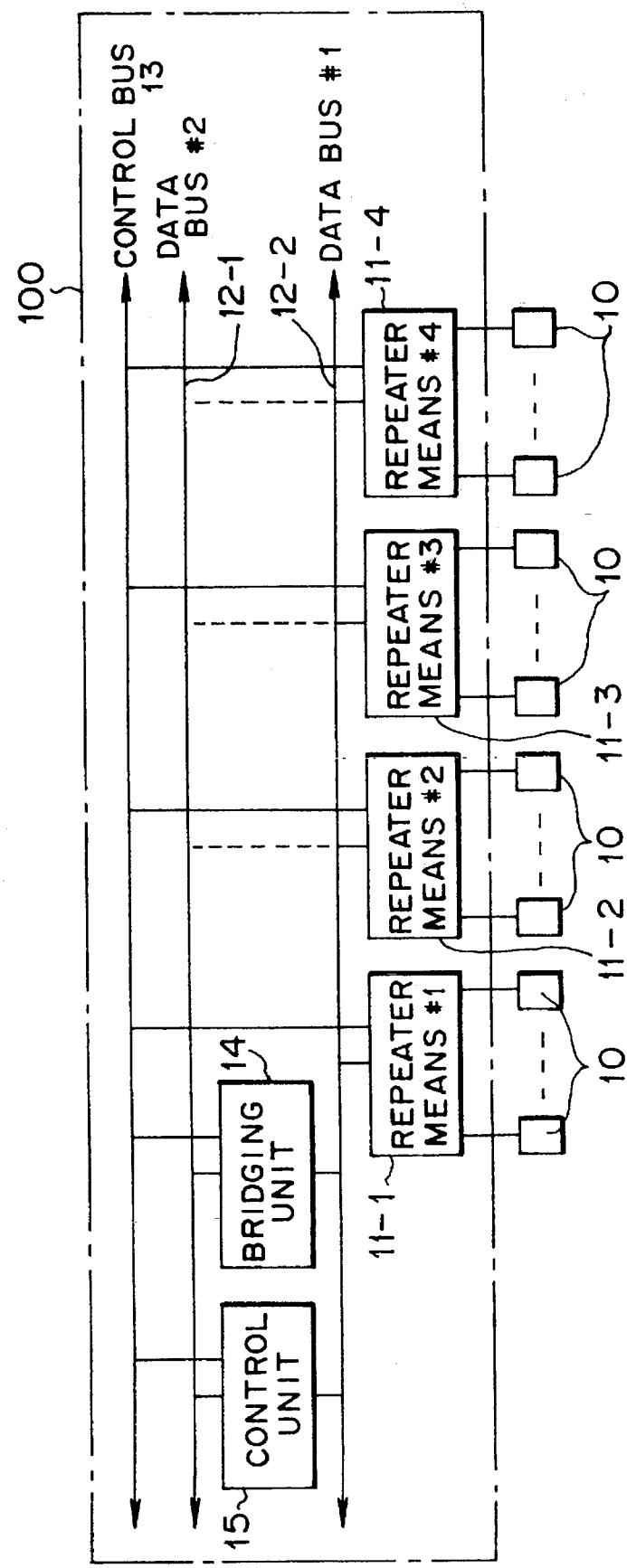
FIG. 2 is a block diagram showing the first embodiment according to the present invention.

(b) Explanation of First Embodiment:

An embodiment of the present invention will be explained in more detail with reference to attached drawings. FIG. 2 is a block diagram showing an embodiment of the present invention. FIG. 2 shows an embodiment in which a smart HUB realizes the present invention. Referring to FIG. 2, numeral 100 represents data communications equipment. The data communication equipment 100 includes a repeater function unit (repeater means) 11-i (i=1 to 4) acting as a module, a bridge function unit (bus connecting unit) 14, a control unit 15, data buses 12-1 and 12-2, and a control bus 13.

For simple explanation, it is assumed that the equipment includes two data buses and four repeater function units 11-i, and all the four repeater function units are connected to the data bus 12-1 at an initial state.

Each repeater unit 11-i is connected to the data terminal 10 via an external interface such as LAN. The repeater unit 11-i inputs data from the a data terminal 10 and then transmits it another terminal and data bus 12-2 each connected to the same repeater unit 11-i. Data communications can be performed by connecting between the repeater function units 11-i and 11-j (i, j=1 to 4 but i≠j) by way of the data bus 12-1 or 12-2.

Numeral 14 represents a bridge function unit (bus connecting unit) acting as bus connecting means to connect between the data buses 12-1 and 12-2. Numeral 15 represents a control unit acting as control means to connect selectively and physically each repeater function unit 11-i to one among plural data buses 12-1 and 12-2.

Both the repeater unit 11-i and the bridge unit 14 are connected to the control bus 13 and are controlled by the control unit 15. The control unit 15 is coupled to the data bus to monitor the traffic on the data bus.

Figure 3:
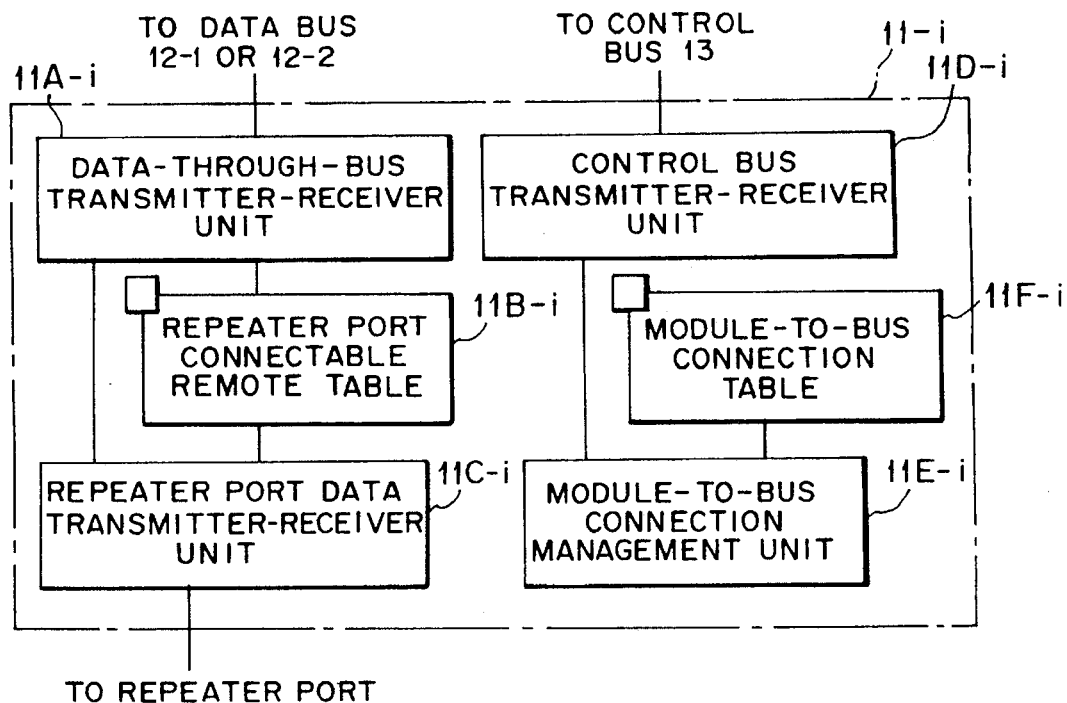
FIG. 3 is a block diagram showing a repeater function unit.

Each repeater unit 11-i is connected to the data terminal 10 via the external interface (LAN) to perform data transmission and reception. Each repeater unit 11-i also receives and transmits data from/to the repeater unit 11-j via the data bus 12-1 or 12-2 within the equipment. Each repeater unit 11-i, as shown in FIG. 3, includes a data transmit/receive unit 11A-i for receiving and transmitting data via the bus, a destination repeater port connection table 11B-i, a repeater port data transmit/receive unit 11C-i, a control bus transmit/receive unit 11D-i, a module-to-bus connection management unit 11E-i, and a module-to-bus connection table 11F-i.

In the present embodiment, there is a single data transmit/receive unit 11A-i corresponding to a portion that transmits and receives data (frame) flowing the internal data bus 12-1 or 12-2. The destination repeater port connection table 11B-i is a table for controlling a device connected to each repeater port of the repeater unit 11-i.

The repeater port data transmit/receive unit 11C-i transmits and receives data (frame) received via a repeater port. There are the repeater port data transmit/receive units (function units) 11C-i corresponding to the number of repeater ports.

The control bus transmit/receive unit 11D-i transmits and receives data (frame) to/from the internal control bus 13. The control bus transmit/receive unit 11D-i is mainly used to receive control data from the control unit 15.

The module-to-bus connection management unit 11E-i receives an instruction regarding a connection bus change from the control unit 15 via the control bus transmit/receive unit 11D-i to perform (1) a connection bus changing and (2) a notification of the connection bus change completion.

The module-to-bus connection table 11F-i is a table to write data buses 12-1 and 12-2 each connected to the function unit (module) which is used to write and reference using the module-to-bus connection management unit 11E-i.

Figure 4:
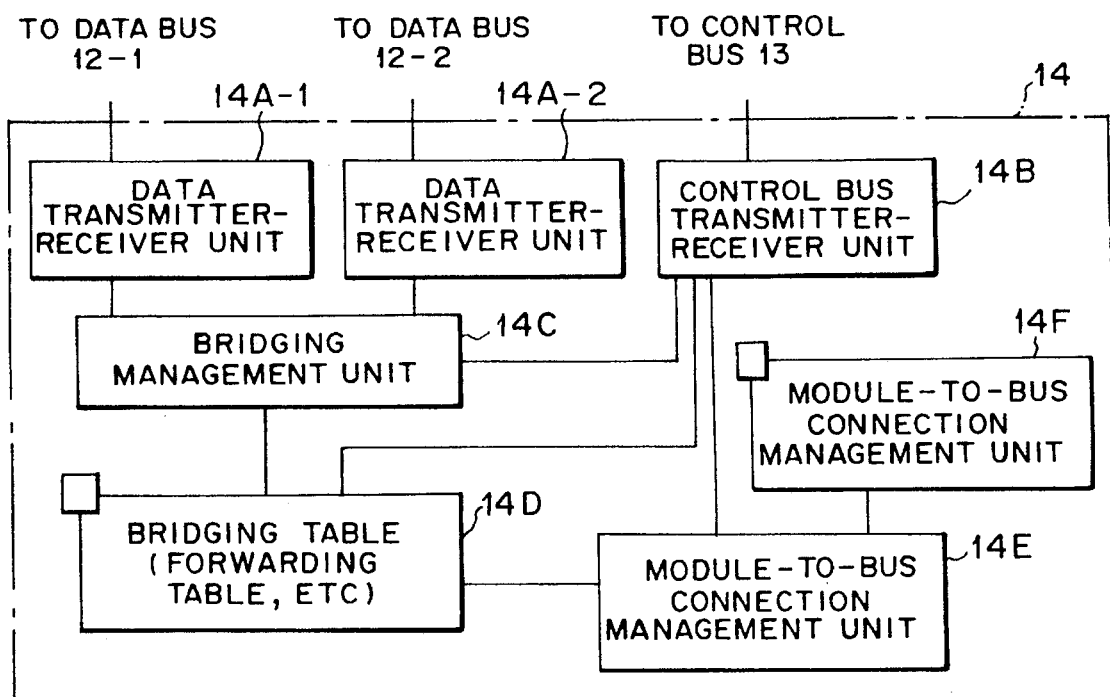
FIG. 4 is a block diagram showing a bridge function unit.

The bridge unit 14 connects two data buses 12-1 and 12-2 to pass only necessary data. The bridge unit 14, as shown in FIG. 4, includes a data transmit/receive unit 14A-1 and 14A-2, a control bus transmit/receive unit 14B, a bridge function management unit 14C, a bridge function table 14D, a module-to bus connection management unit 14E, and a module-to-bus connection table 14F.

The data transmit/receive units 14A-1 and 14A-2 are transmits and receives data (frame) flowing the internal data buses 12-1 and 12-2. There are the data transmit/receive units (function units) 14A-1 and 14A-2 each corresponding to the number of bridging ports.

The control bus transmit/receive unit 14B transmits and receives data (frame) to the internal control buses 13 and is used to receive mainly the control data from the control unit 15.

The bridge function management unit 14C bridges data received from the data transmit/receive unit 14A-1 and 14A-2 based on information in the bridge function table 14D to enable communications between data buses 12-1 and 12-2.

The bridge function table 14D is a table used to bridge between the data buses 12-1 and 12-2. A forwarding table, for example, is used as the bridge function table 14D.

The module-to-bus connection management unit 14E receives a connection-bus changing instruction from the control bus transmit/receive unit 14B via the control unit 15, and then performs (1) a connection bus changing, (2) a change of the contents of the bridge function table 14D and the module-to-bus connection table 14F, and (3) a notification of a connection bus change completion.

The module-to-bus connection table 14F is a table used to write to data bus connected by the repeater unit (module). The module-to-bus connection management unit 14 writes onto and refers to the table.

Figure 5:
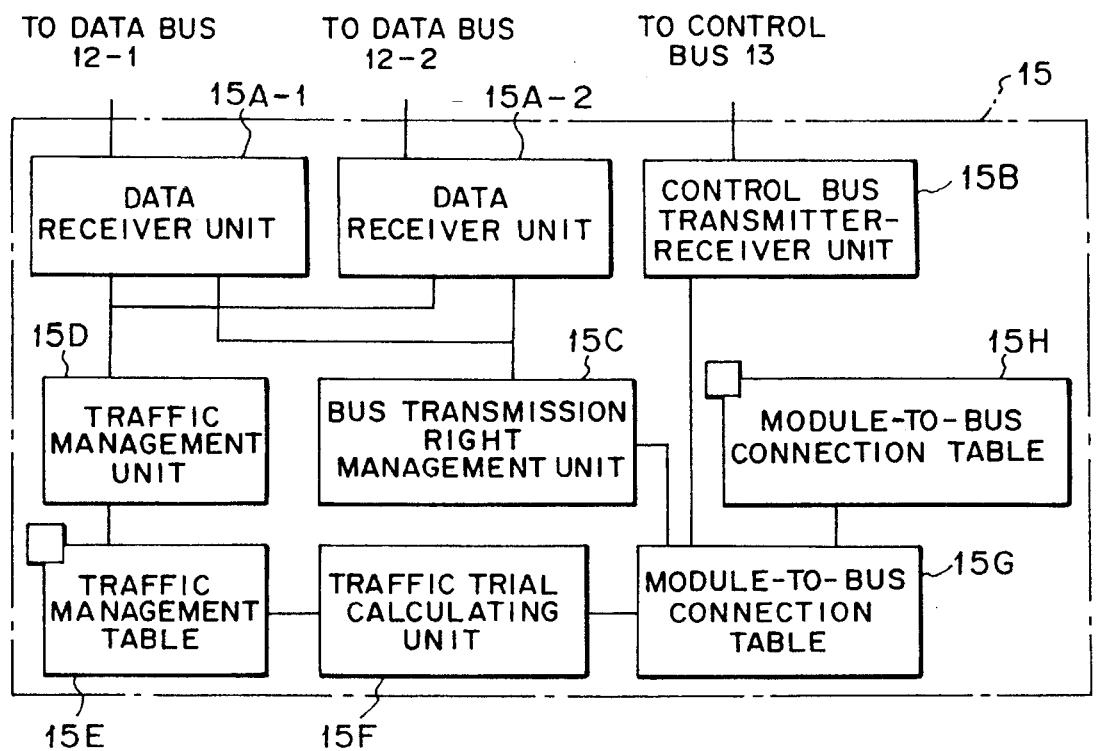
FIG. 5 is a block diagram showing a control unit.

The control unit 15 is a control portion to control the equipment. The control unit 15 monitors data through the data bus 12-1 or 12-2, or functions as a configuration management. The control unit 15 also controls connecting the repeater function unit 11-i to the data bus 12-1 or 12-2. The control unit 15, as shown in FIG. 5, includes data receiving units 15A-1 and 15A-2, a control bus transmit/receive unit 15B, a bus transmission right management unit 15C, a traffic management unit 15D, a traffic management table 15E, a trial traffic calculating unit 15F, a module-to-bus connection management unit 15G, and a module-to-bus connection table 15H.

The data receiving units 15A-1 and 15A-2 receive internal data (frame) flowing the data buses 12-1 and 12-2. There are the data receiving units (function units) 15A-1 and 15A-2 corresponding to the number of data buses.

The control bus transmit/receive unit 15B that receives and transmits data (frame) from/to the internal control bus 13 is chiefly used to transmit control data to other function units.

The bus transmission right management unit 15C manages that what data bus is connected to each repeater unit, in accordance with data through the data bus.

The traffic management unit 15D manages the traffic of each data bus, in accordance with data through the data bus.

The traffic management table 15E is a table used to write the traffic of each data bus. The traffic management unit 15D writes the contents onto the traffic management table 15E. The trial traffic calculating unit 15F refers to the content of the traffic management table 15E.

The trial traffic calculating unit 15F calculates roughly to decide the most suitable bus using method, based on the content (the traffic of each data bus) of the traffic management table 15E. This rough calculating method will be explained later. The trial traffic calculating unit 15F instructs the each module-to-bus connection management unit 15G to switch the bus.

Each module-to-bus connection management unit 15G receives the information regarding a most suitable bus using method from the trial traffic calculating unit 15F and instructs, if necessary (if the information is different from the content of each module-to-bus connection table 15H), each repeater unit (module) to switch the currently connected bus. Each module-to-bus connection management unit 15G receives switching completion information to modify the content of the connection bus table 15H for each module.

The module-to-bus connection table 15H for each module is a table used to write data bus to which each repeater unit (module) is connected. Each module-to-bus connection management unit 15G writes onto and refers to the table 15H.

Hence, in all the functions considered, the control unit 15 includes equivalently the following elements.

That is, the control unit 15 functions as bus switching control means that switches the data bus 12-1 or 12-2 to be connected according to the traffic of each repeater unit 11-i to optimize the load of the data bus 12-1 or 12-2. The bus switching control means also includes counting means for counting the amount of data sent to the data bus 12-1 or 12-2 from each repeater unit 11-i, and bus switching means for switching the data bus 12-1 or 12-2 connected to the corresponding repeater unit 11-i, based on information regarding the amount of data from the counting means.

The bus switching control means also includes counting means for counting the amount of data sent to the data bus 12-1 or 12-2 from each repeater unit 11-i by a destination basis, and bus switching means for switching the data bus 12-1 or 12-2 connected to the corresponding repeater unit 11-i, based on information regarding the amount of data by the destination basis obtained by the counting means.

The bus switching control means also includes trial traffic calculating means (refer to the trial traffic calculating unit 15F) for roughly calculating the traffic on each data bus, based on the count result by the counting means, and change aspect instructing means for instructing each repeater unit 11-i of a changing aspect based on the result from the trial traffic calculating means to minimize the load of the data bus.

When receiving information regarding that the traffic is heavy on a different data bus 12-1 or 12-2 between specific repeater function units 11-i and 1 1-j, the bus switching control means changes the module (repeater unit) configuration.

The bus switching control means includes access right halting means for halting the access right to the data bus 12-1 or 12-2 of the repeater unit 11-i to change the connection of the data bus 12-1 or 12-2, and means for instructing rewriting data bus connection information into the information obtained after the data bus connection has been switched to connect the repeater unit 11-i to the switched data bus.

The time slot using high speed time-sharing multiplex bus may virtually form a plurality of data bus.

Figure 6:
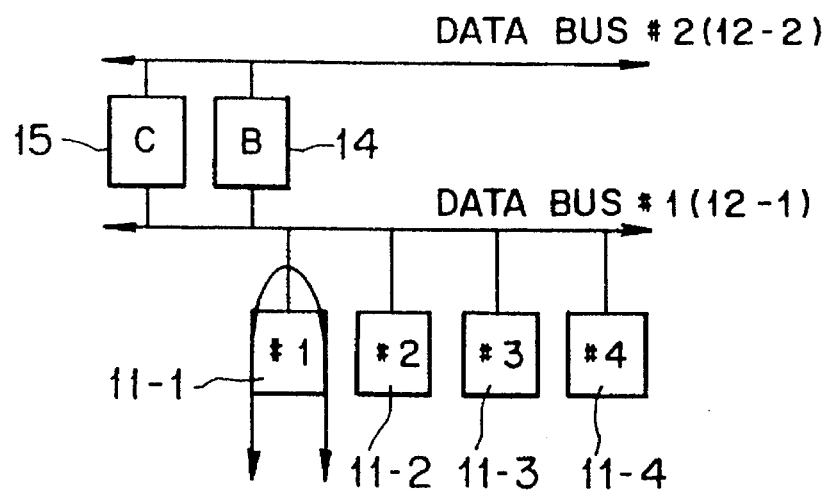
FIG. 6 is a diagram of explaining why a data bus traffic increases.
Figure 7:
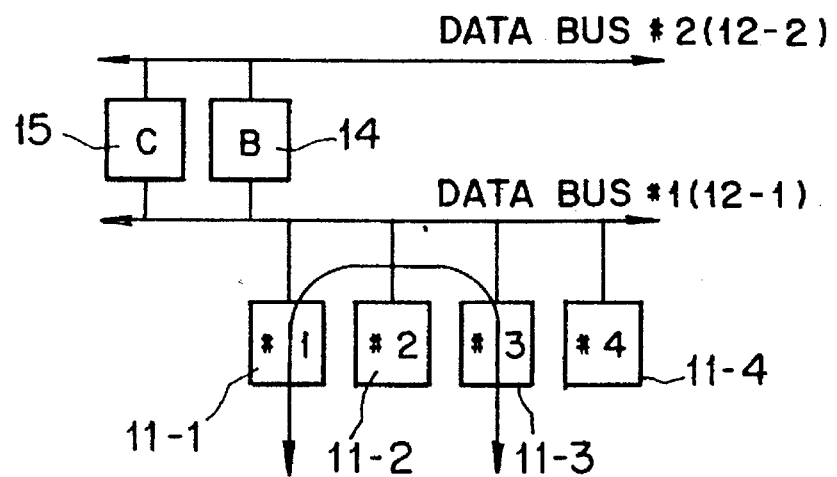
FIG. 7 is a diagram of explaining why a data bus traffic increases.

In the configuration above, the control unit 15 performs a desired control to distribute the load of the internal bus 12-1 or 12-2. The concrete operation will be explained as follows:

FIGS. 6 and 7 show examples by which the traffic of the data bus 12-1 increases: (1) the data in one repeater function unit 11-i is large (refer to FIG. 6) and (2) the data between two repeater function units 11-i and 11-j is large (refer to FIG. 7).

(1) First, explanation will be made as for the method of discriminating using the repeater unit 11-i that treats a large amount of data communications.

(1-1) Method 1-1 (defined by claims 2 and 9)

If the amount of data per time (a predetermined measuring time) which each repeater function unit 11-i transmits to the data bus #1 (12-1) is t1, t2, t3, t4, the traffic T per time on the data bus #1 (12-1) is expressed by:

$$T = \Sigma\, ti$$

where i=1 to 4, and $\Sigma$ t1=(t1+t2+t3+t4).

The control unit 15 counts t1, t2, t3, and t4 to calculate the traffic T.

When the traffic T exceeds the threshold Ts of a predetermined traffic, the control unit 15 decides that the traffic of the data bus has increased and then operates as follows:

First, the case shown in FIG. 6 or 7 is decided in accordance with the amount t1, t2, t3, or t4 of data of each repeater unit 11-i. The deciding methods will be described below.

(i) The case shown in FIG. 6

In this case, the repeater unit #1 (11-1) transmits data transmitted to the data bus 12-1 extremely larger in amount than other repeater function units 11-2 and 12-4.

$$t1 \gg t2,\, t3,\, t4$$

Figure 8A:
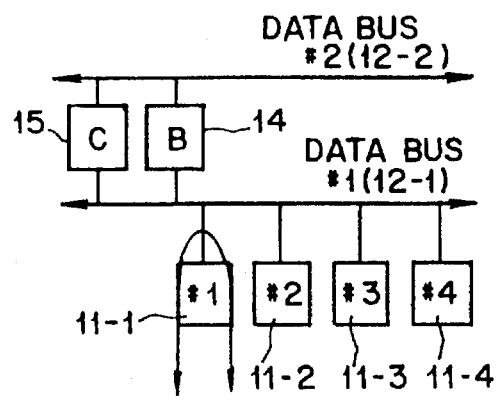
FIG. 8(a) is a diagram explaining an aspect of an increased traffic process.
Figure 8B:
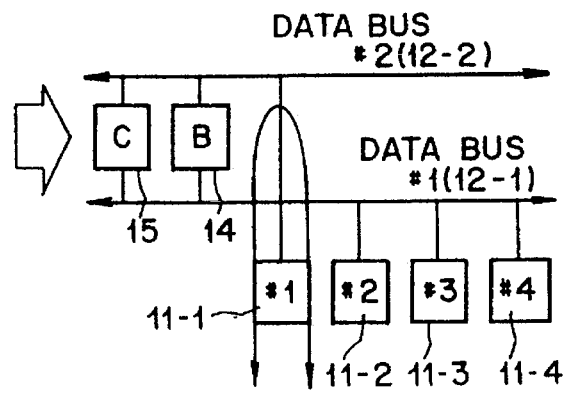
FIG. 8(b) is a diagram explaining an aspect of an increased traffic process.

Therefore, the repeater unit #1 (11-1) is connected to the data bus #2 (12-2) (refer to FIGS. 8(a) and 8(b)).

(ii) The case shown in FIG. 7

The repeater units #1 (11-1) and #3 (11-3) transmit data transmitted to the data bus 12-1 extremely larger in amount than other repeater units 11-2 and 12-4.

$$t1,\, t3 \gg t2,\, t4$$

Figure 9A:
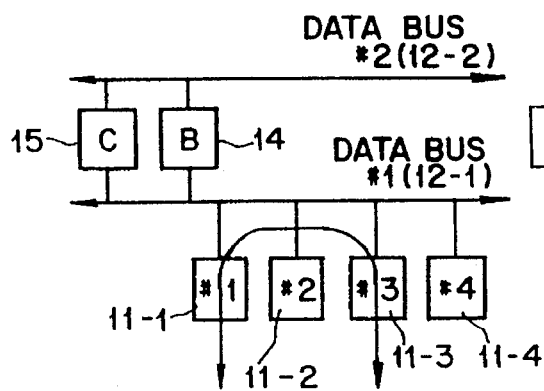
FIG. 9(a) is a diagram explaining an aspect of an increased traffic process.
Figure 9B:
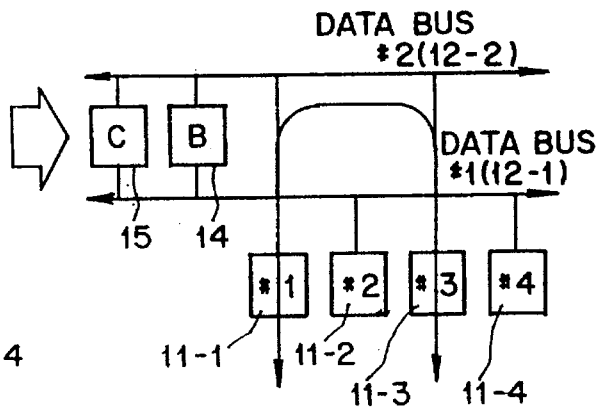
FIG. 9(b) is a diagram explaining an aspect of an increased traffic process.

Therefore, the repeater units #1 (11-1) and #3 (11-3) are connected to the data bus #2 (12-2) (refer to FIGS. 9(a) and 9(b)).

Figure 12:
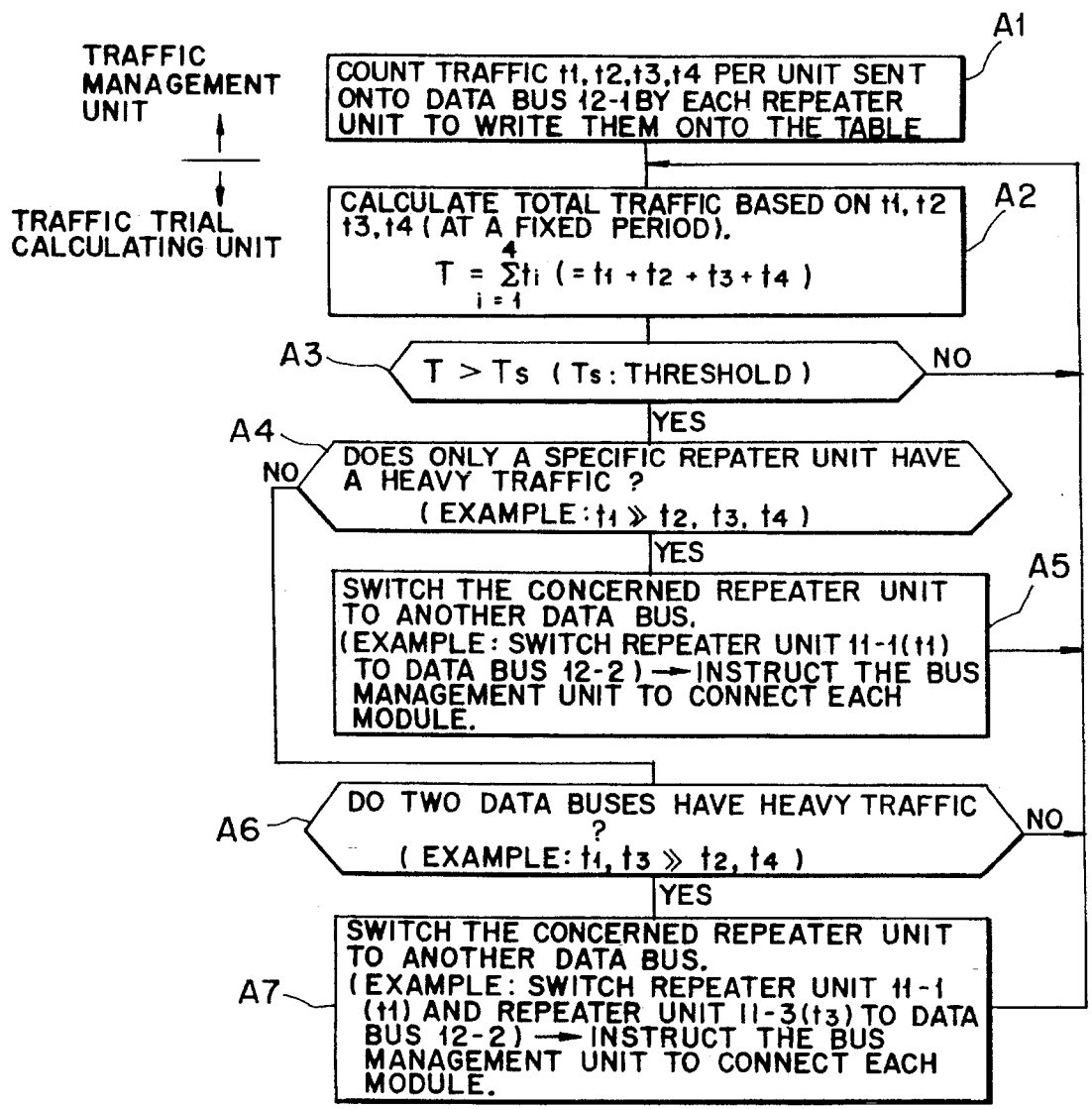
FIG. 12 is a flow chart explaining the function of the first embodiment according to the present invention.

The function of the method 1-1 will be explained with the flow chart shown FIG. 12.

First, the traffic management unit 15D in the control unit 15 counts the traffic t1, t2, t3, or t4 per time transmitted on the data bus 12-1 by each repeater unit 11-i to write it onto the traffic management table 15E (step A1). Thereafter, the trial traffic calculating unit 15F calculates the total traffic based on the traffic t1, t2, t3, and t4 (step A2).

In the step A3, it is decided whether the traffic T has exceeded a predetermined threshold Ts. If the traffic T exceeds a predetermined threshold Ts, it is decided that the bus traffic has increased to discriminate the case shown in FIG. 6 or FIG. 7.

That is, it is decided whether only a specific repeater unit has a heavy traffic (for example, t1>>t2, t3, t4) (step A4). If yes, the concerned repeater unit is switched to another data bus (refer to FIGS. 8(a) and 8(b) in step A5). For example, in order to connect the repeater unit 11-1 to the data bus 12-2, the fact is instructed to the module-to-bus connection management units 11E, 14E and 15E.

When only a repeater unit has a light traffic, the flow goes to the NO route in the step A4. In the step A6, it is decided whether each of two data buses 12-1 and 12-2 has a heavy traffic (for example, t1, t3>>t2, t4) (step A6). If the traffic is heavy, the concerned repeater unit is switched to another bus (step A7). For example, in order to the repeater units 11-1 and 11-3 to the data bus 12-2, the fact is transmitted to the module-to-bus connection management units 11E-1, 11E-3, 14E, and 15G. The trial traffic calculating unit 15F executes the processes in the steps A2 to A7.

In the method 1—1, in order to optimize the load of the data bus 12-1 or 12-2 in the control unit 15, the data bus connected is switched in accordance with the traffic of the repeater unit 11-i. In concrete, the repeater unit 11-i counts the data transmitted to the data bus 12-1 or 12-2. The concerned repeater unit 11-i switches the data bus to be connected based on the information regarding the data. Hence, the method 1—1 can adopt (1) the internal bus load recognizing method, or (2) the suitable bus connecting method for the repeater unit 11-i to reduce the bus load. These methods allow an internal configuration or module configuration to reduce (distribute) the load.

(1-2) Method 1-2 (defined by claims 5 and 12)

In some cases, the method 1—1 may not be suitable to transfer, for example, a file using LAN.

If the repeater unit #1 (11-1) transfers a file to the repeater unit #3 (11-3), it, for example, transfers a large amount of data t1 to the data bus 12-1, but the repeater unit #3 (11-3) transfers a small amount of data t3 to the data bus 12-1. Hence, the data amount t1, t2, t3, or t4 of each repeater function unit is expressed by the following formula:

$$t1 \gg t2,\, t3,\, t4$$

Figure 10A:
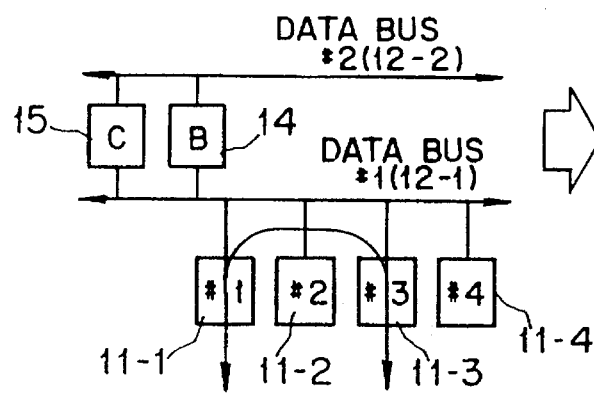
FIG. 10(a) is a diagram explaining an aspect of an increased traffic process.
Figure 10B:
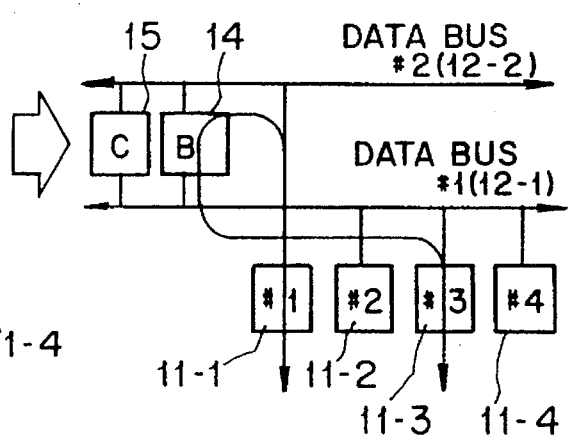
FIG. 10(b) is a diagram explaining an aspect of an increased traffic process.

In the method 1-1, only the data amount t1 is sent to the data bus #2 (12-2). Since the repeater unit #1 (11-1) transmits data to the repeater unit #3 (12-3) via the bridging unit 14, the traffic of the data bus #1 (12-1) is held to that before the switching operation (refer to FIGS. 10(a) and 10(b)).

Hence, in order to reduce the traffic of the data bus #1 (111), the repeater unit #3 (11-3) has to be switched to the data bus #2 (12-2).

In the case of the file transfer, a monitor which monitors data passing through the bridging unit 14 is used as means for recognizing the opposite communication party of the repeater unit #1 (11-1). The bridging unit 14 forwards the frame, based on the destination address of the data frame. Referring to FIG. 10, since the bridging unit 14 monitors the destination address of a frame, it can informs the control unit 15 that many frames for the repeater unit #3 (11-3) exist. Thus, the control unit 15 switches the repeater unit #3 (11-3) to the data bus #2 (12-2) to reduce the traffic of the data bus #1 (12-1) (refer to FIGS. 11(a) and 11(b)).

Figure 13:
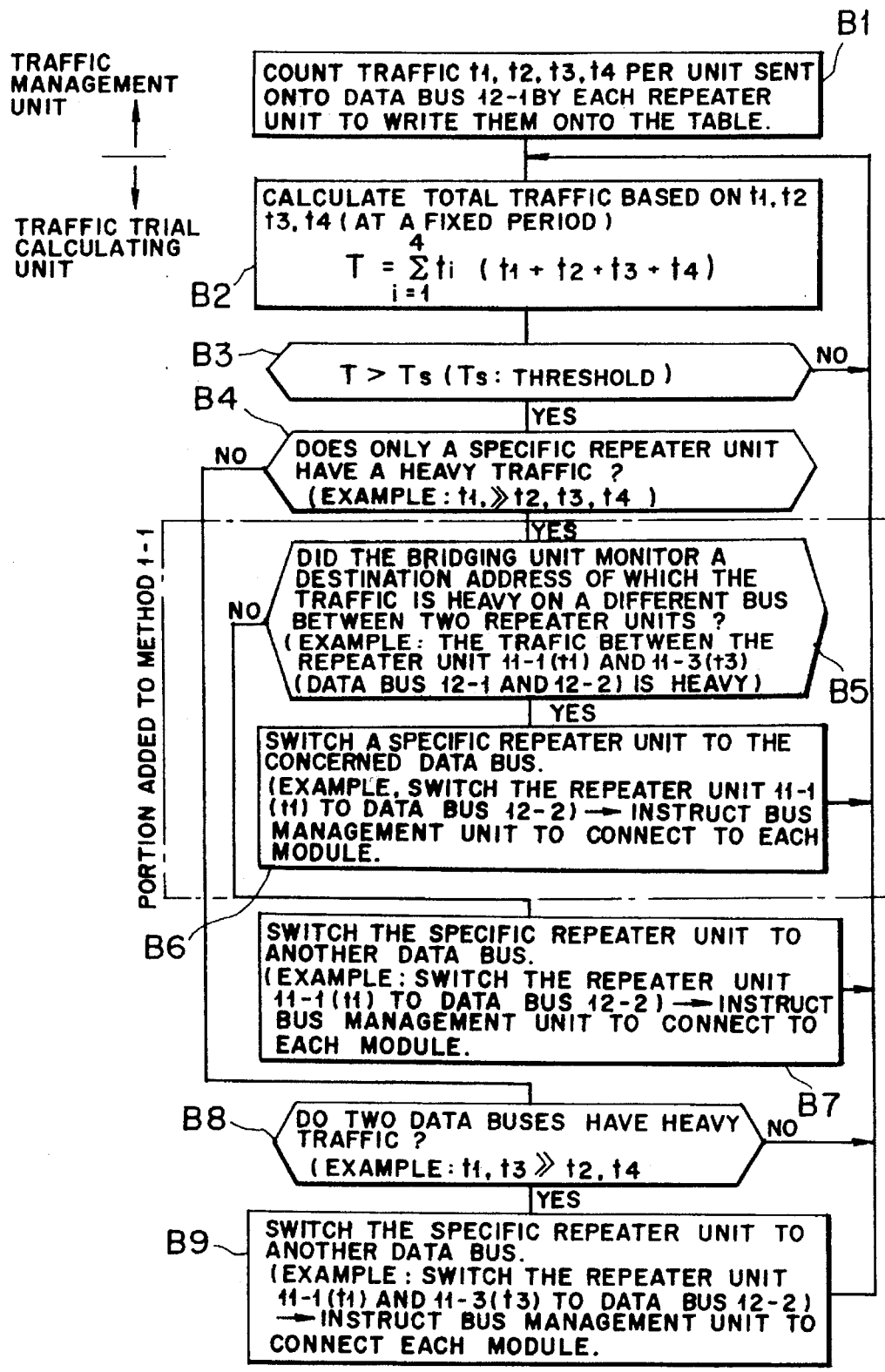
FIG. 13 is a flow chart explaining the function of the first embodiment according to the present invention.

FIG. 13 shows a flow chart used for explaining the steps of the method 1-2. The method 1-2 will be explained with reference to FIG. 13.

In the traffic management unit 15D within the control unit 15, each repeater unit counts the traffic t1, t2, t3, or t4 per time transmitted onto the data bus 12-1 to write it into the traffic management table 15E (step B1). Thereafter, the trial traffic calculating unit 15F calculates the total traffic based on the traffic t1, t2, t3, t4 (step B2).

It is decided in the step B3 whether the traffic T has exceeded a predetermined traffic Ts. If the traffic exceeds the traffic Ts, it is decided that the bus traffic has increased, thus recognizing the case shown in FIG. 6, the case shown in FIG. 7, or the case of a file transfer.

That is, it is decided whether a specific repeater unit has a heavy traffic (for example, t1>>t2, t3, t4) (step B4). If yes, it is decided whether the traffic on a different data bus between two repeater units is heavy, based on the result obtained by monitoring the destination address by the bridging unit 14 (step B5).

If the decision is NO in the step B5, one concerned repeater unit is switched to another data bus in the step B7. For example, the control unit 5 instructs the module-to-bus connection management 11E-1, 14E, and 15G to switch the repeater unit 11-1 to the data bus 12-2.

Figure 11A:
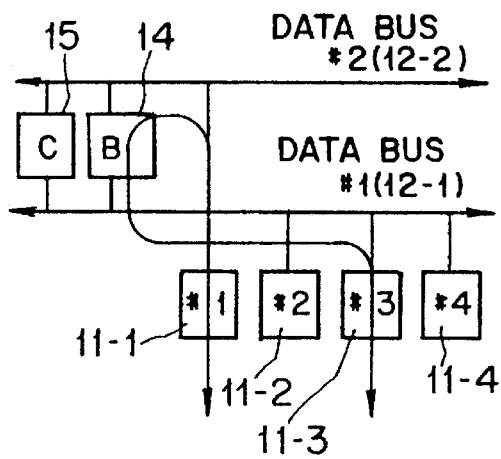
FIG. 11(a) is a diagram explaining an aspect of an increased traffic process.
Figure 11B:
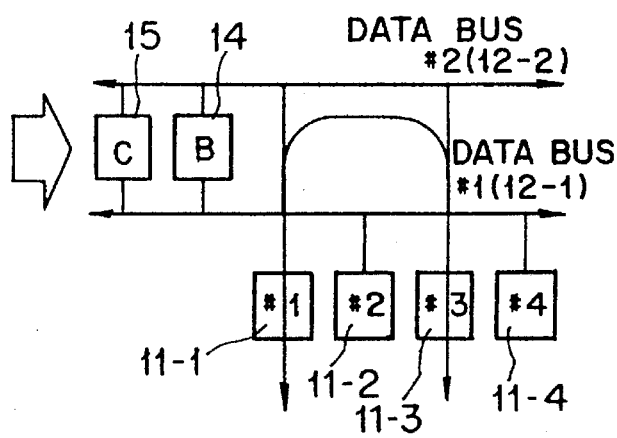
FIG. 11(b) is a diagram explaining an aspect of an increased traffic process.

If the decision is YES in the step B5, the concerned repeater unit is switched to the corresponding data bus (refer to FIGS. 11(a) and 11(b) in the step B6). For example, the control unit 5 instructs the module-to-bus connection management units 11E-1, 11E-3, 14E and 15G to switch the repeater unit 11-1 to the data bus 12-2.

If it is decided that only a specific repeater unit has a small amount of traffic, the flow goes to the NO route in the step B4. Then, it is decided in the step B8 whether the traffics on two data buses are heavy (for example, t1, t3>>t2, t4). If yes, the corresponding function unit is switched to another data bus (step B9). For example, in order to switch the repeater units 11-1 and 11-3 to the data bus 12-2, the control unit 5 instructs the module-to-bus connection management units 11E-1, 11E-3, 14E, and 15G to execute the switching operation. As described above, the steps B2 to B9 are executed by the trial traffic calculating unit 15F.

According to this method 1-2, the control unit 15 switches data bus to be connected in accordance with the traffic of each repeater unit 11-1 to optimize the load of the data bus 12-1 or 12-2. In concrete, the bridging unit 14 monitors the passing traffic. If the traffic on a different data bus between specific repeater units 11-i and 11-j is heavy, the bridging unit 14 informs the control unit 15 of the fact to modify the module configuration. Hence, for the file transfer operation, it is possible to adopt two methods: (1) the internal bus load recognizing method, and (2) the suitable bus connecting method for each repeater unit 11-i to reduce a bus load. These methods allow the internal configuration or module configuration to reduce (distribute) the load of equipment.

(1-3) Method 1-3 (defined by claims 3 and 10)

According to the method 1-3, the control unit 15 counts data per time (a predetermined measuring time) by destination address transmitted from each repeater unit to the data bus #1 (11-1). Hence, the control unit 15 needs a table used to manage data by destination and origination, or the traffic management table 15E.

Now, if the data amount per time which is transmitted from the repeater unit at an originating station S to the repeater unit at a destination station is tDS, the traffic T of the data bus #1 (11-1) per time is expressed by the following formula:

$$T = \Sigma \Sigma \, t_{ij}$$

where i=1 to 4 and j=1 to 4, and $\Sigma$ is a total sum of i1 to i4 or a total sum of j1 to j4.

When the traffic T exceeds a predetermined traffic threshold Ts, the control unit 15 decides that the bus traffic has increased. Then, the following operation is performed.

That is, the data amount tDS is used to decide the case of FIG. 6 or FIG. 7. The deciding method is as follows:

First, the maximum amount of data tDS (max) is searched among the data amount tDS. When the originating address and destination address are the same (D=S=i) at the maximum threshold tDS (max), the communications in the repeater unit #i (11-i) is heavy. Namely, since the case described above corresponds to the case shown in FIG. 6, the data bus connection to the repeater unit #i (1 1-i) is changed. In the case shown in FIG. 6, tDS (max)=t11.

At the data amount tDS (max), when the destination address is different from the originating address (D=i, S=j), the data bus coupling between the repeater unit #i (11-i) and the repeater unit #j (11-j) is changed. The case shown in FIG. 7 represents to (tDS (max)=t13).

Figure 14:
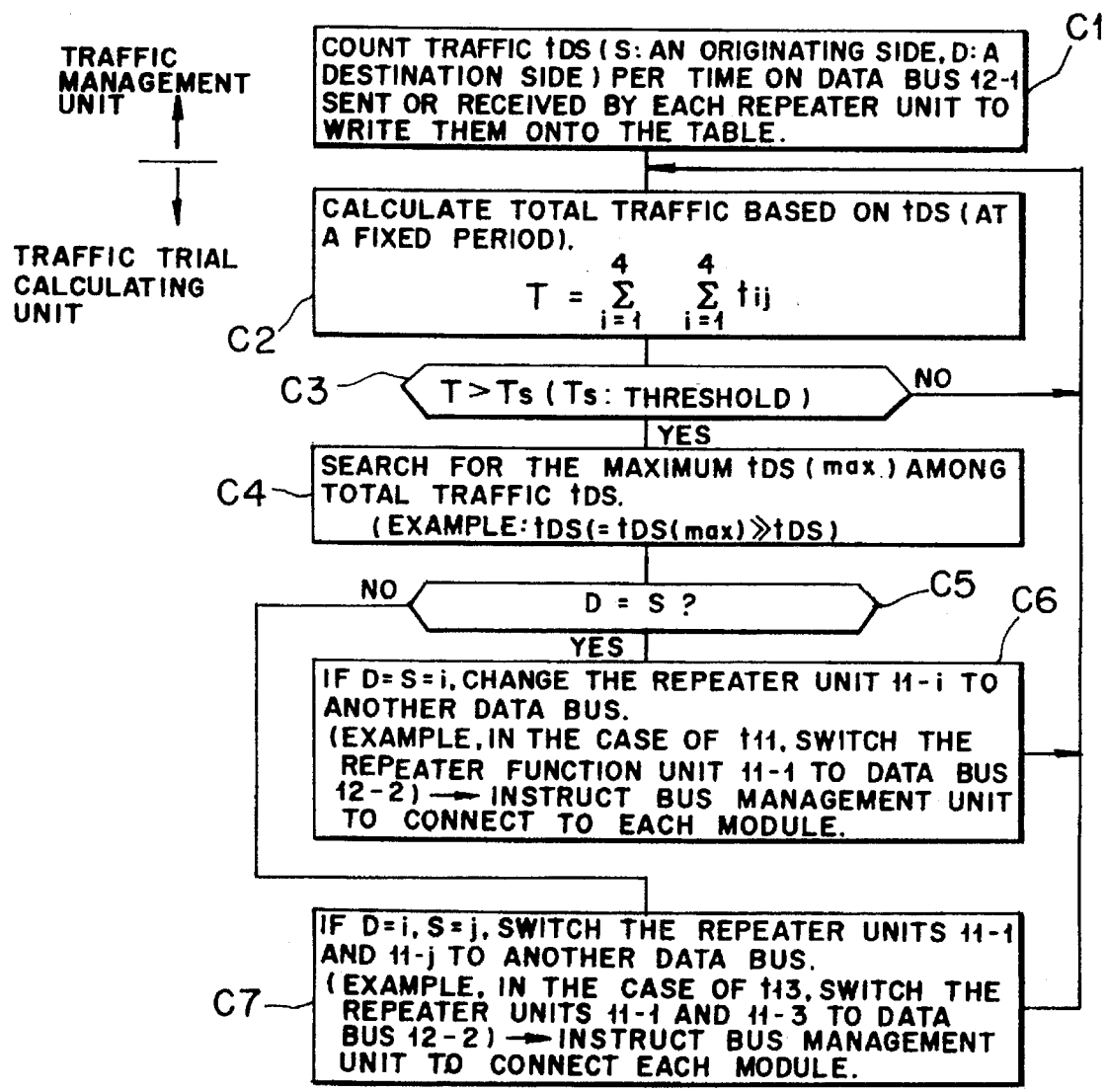
FIG. 14 is a flow chart explaining the function of the first embodiment according to the present invention.

FIG. 14 shows a flow chart used for explaining the function of the method 1-3.

In the traffic management unit 15D within the control unit 15, each repeater unit counts the traffic tDS per time (of the originating station S, the destination address D) transmitted onto the data bus 12-1 to write the result to the traffic management table 15E (step C1). Then, the trial traffic calculating unit 15F calculates the total traffic based on the traffic tDS (step C2).

It is decided whether the traffic T exceeds a predetermined traffic Ts in the step C3. If yes, the maximum traffic tDS (max) is searched among all the traffics tDS.

Next, it is decided in the step C4 whether the originating address and the designation address are the same. If yes, the repeater unit 11-i is connected to another data bus. For example, the repeater unit 11-1 is switched to the data bus 12-2, the control unit 5 instructs the module-to-bus connection management units 11E-1, 11E-3, 14E, and 15G to execute the switching operation.

If the originating address differs from the destination address, the flow goes to NO route in the step C5. In the step C7, the repeater units 11-i and 11-j are switched to another data bus. For example, the control unit 5 instructs the module-to-bus connection management units 11E-1, 11E-3, 14E, and 15G to switch the repeater units 11-1 and 11-3 to the data bus 12-2.

In the method 1-3, the control unit 15 switches the data bus in accordance with the traffic of each repeater unit 11-i to optimize the load of the data bus 12-1 or 12-2. In concrete, in the control unit 15, each repeater unit 11-i counts data transmitted to the data bus by destination address and the repeater unit 11-i changes the data bus to be connected. Hence, in order to perform a file transfer, based on the data amount information by a destination basis, it is possible to divide by destination (1) the internal bus load recognizing method and (2) the suitable bus connection method for each repeater unit 11-i to reduce a bus load. This feature allows the internal configuration or module configuration to reduce (distribute) the device load.

(1-4) Method 1-4 (defined by claims 4 and 11)

As the method 1-3 described above, when the amount of data tDS per time transmitted from the originating address S to the destination address D can be counted, the traffic on each bus can be roughly calculated based on the amount of data tDS after a bus to be connected to each repeater unit has been changed.

A method for deciding a bus to be connected to each repeater unit 11-i, based on the trial calculation result, is shown below. In this case, the equipment needs a function of roughly calculating the traffic of each bus based on the each data amount tDS. The trial traffic calculating unit 15F in the control unit 15 accepts that function.

For example, let us assume that the traffic of each bus is roughly calculated in the case where both the repeater units #1 (11-1) and #3 (11-3) among the repeater units #1 (11-1) to #4 (11-4) connected to the data bus #1 (12-1) are switched to the data bus #2 (12-2), as shown in FIG. 9.

The traffic T1 of the data bus #1 (12-1) is expressed by the following formula:

$$T1 = \Sigma\, t_{i2} + \Sigma\, t_{i4}$$

where i=1 to 4, and $\Sigma\, t_{i2} + \Sigma\, t_{i4} = (t_12 + t_22 + t_32 + t_42 2) + (t_{14} + t_24 + t_34 + t_44)$.

The traffic $T_{1B}$ flowing the data bus #2 (12-2) via the bridging unit 14 is expressed by the following formula:

$$T_{1B} = t_{12} + t_32 + t_14 + t_34$$

The traffic $T_2$ of the data bus #2 (12-2) is expressed by the following formula:

$$T_2 = \Sigma\, t_{i1} + \Sigma\, t_{i3}$$

where i=1 to 4, and $\Sigma\, t_{i1} + \Sigma\, t_{i3} = (t_{11} + t_21 + t_31 + t_41) + (t_{13} + t_23 + t_33 + t_43)$.

The traffic $T_{2B}$ flowing the data bus #1 (12-1) via the bridging unit 14 is expressed by the following formula:

$$T_{2B} = t_{21} + t_41 + t_23 + t_43$$

As described above, the traffic of each bus can be roughly calculated.

In the embodiment shown in FIG. 9, 16 kinds of cases can be considered by connecting the repeater units #1 (11-1) to #4 (11-4) to the data bus #1 (12-1) or #2 (12-2) immediately before the bus to be connected to the repeater unit is changed. The traffic of each bus is roughly calculated in the 16 cases. The case is adopted where the traffic $(T_{1B} + T_{2B})$ flowing another data bus via the bridging unit 14 is minimized.

Thereafter, in the repeater units #1 (11-1) to #4 (11-4), the data buses #1 (12-1) and #2 (12-2) are selected to connect to the repeater unit 11-i.

Figure 15:
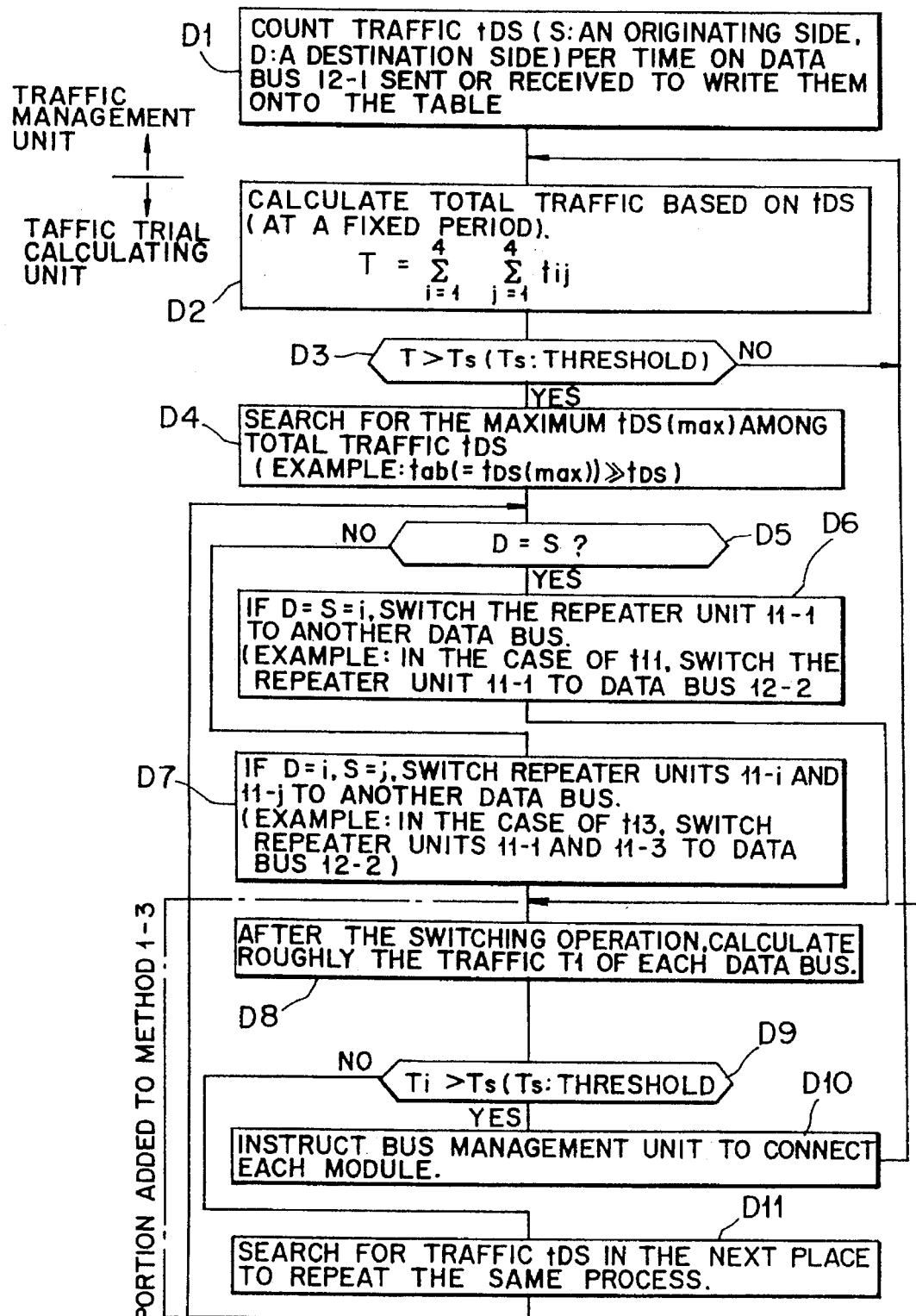
FIG. 15 is a flow chart explaining the function of the first embodiment according to the present invention.

FIG. 15 shows a flow chart used for explaining the function of the method 1-4.

In the traffic management unit 15D within the control unit 15, each repeater unit counts the traffic $T_{DS}$ (an originating address S and a destination address D) per time transmitted to the data bus 12-1 to write the result onto the traffic management table 15E (step D1). Thereafter, the trial traffic calculating unit 15F calculates the total traffic based on the traffic $T_{DS}$ (step D2).

It is decided whether the traffic T exceeds the traffic threshold Ts in the step D3. If the traffic T is exceeds the predetermined traffic threshold Ts, the maximum traffic (tDS (max) is searched from the total traffics tDS (step D4).

Next, it is decided in the step D5 whether the originating address and the destination address is the same. If yes, the repeater unit 11-i is switched to another data bus (step D6). For example, the module-to-bus connection management units 11E-1, 11E-3, 14E, and 15G are instructed in order to switch the repeater unit 11-1 to the data bus 12-2.

If the originating address is different from the destination address, the flow goes to NO route in the step D5. The repeater units 11-i and 11-j are changed to another data bus in the step D7. For example, in order to switch the repeater units 11-1 and 11-3 to the data bus 12-2, the module-to-bus connection management units 11E-1, 11E-3, 14E, and 15G are instructed.

After the steps D6 and D7, the traffic T1 of each data bus after a switching operation is roughly calculated in the step D8. In the step D9, the calculation result T1 is compared with the traffic threshold Ts. If Ti>Ts, the module-to-bus connection management units lIE-i, 14E, and 15G are instructed in the step D10. If Ti≤Ts, the next tDS is searched in the step D11 to repeat the same process.

According to the method 1-4, the control unit 15 is switched to the data bus connected in accordance with the traffic of each repeater unit 11-i to optimize the load of the data bus 12-1 or 12-2. In concrete, in the data communications equipment, each repeater unit 11-i calculates roughly the traffic transmitted to each data bus, based on the result obtained by counting the amount of data outputted on the data bus on a destination basis. As for the changing aspect of the data bus connected by each repeater function unit 11-i, the control unit 15 instructs each repeater unit 11-i to form a changing aspect where the load of the data bus is minimized, based on the traffic result calculated roughly after the data bus changing operation. As a result, the system internal configuration or module configuration that can effectively reduce (distribute) the system load can be established by selecting by destination (1) an internal bus load recognizing method, and (2) a suitable bus connecting method for each repeater unit 11-i to reduce (distribute) effectively the bus load.

(2) Bus Switching Procedure

In order to change the data bus to be connected to the repeater unit 11-i, the information regarding the destination of the bridging unit 14 which interconnects the data buses 12-1 and 12-2 must be changed. This approach includes the following methods:

(2-1) Method 2-1 (defined by claims 6 and 13)

Explanation will be made as for an embodiment including the method 2-1, referring to FIG. 16.

The control unit 15 recognizes first that the repeater unit #1 (11-1) wants for changing the data bus (refer to FIG. 16(a)).

Next, the control unit 15 gains the access right of the data bus #1 (12-1) and #2 (12-2) (refer to FIG. 16(b)). For that reason, the repeater units #1 (11-1) to #4 (11-4) cannot access to the data bus #1 (12-1).

Thereafter, the control unit 15 changes the address table of the bridging unit 13 via the control bus 13 (refer to FIG. 16(*c*)). That is, in order to switch the repeater unit #1 (11-1) to the data bus #2 (12-2), the address table for the bridging unit 14 is modified.

Moreover, the control unit 15 changes the destination of the repeater unit #1 (11-1) from the data bus #1 (12-1) to the data bus #2 (12-2) (refer to FIG. 16(*d*)).

The control unit 15 releases the access right of the data buses #1 (12-1) and #2 (12-2) (refer to FIG. 16(*e*)). The repeater units #1 (11-1) to #4 (11-4) can access to the data buses #1 (12-1) and #2 (12-2).

After the control unit 15 halts the access right to the data bus of the repeater unit that changes the bus connection, the repeater unit 11-i is connected to the changed data bus by rewriting the connection information in the bridge function unit 14 into the information obtained after the data bus connection has been changed. Hence, the interbus connecting unit (bridging unit 14) can change the setting information by (1) an internal load recognizing method and (2) a bus connecting method for each module suitable to reduce a bus load. This approach allows the internal configuration or module configuration to reduce (distribute) the device load.

(2—2) Method 2—2 (defined by claim 7)

The concerned embodiment will be explained with reference to FIG. 17.

The control unit 15 recognizes first that the repeater unit #1 (11-1) wants for changing a data bus connection (refer to FIG. 17(*a*)).

Next, the control unit 15 gains the access right of the data buses #1 (12-1) and #2 (12-2) (refer to FIG. 17(*b*)). For that reason, the repeater units #1 (11-1) to #4 (11-4) cannot be accessed to the data bus #1 (12-1).

Thereafter, the control unit 15 transmits the information to change the address table of the bridging unit 14 via the data bus #2 (12-2) (refer to FIG. 17(*c*)).

The method 2—2 uses a learning function being a function of the upper layer of the bridging unit 14. The repeater unit #1 (11-1) transmits a frame to the bridging unit 14 via the data bus #2 (12-2) to vary the address table by the learning function of the bridging unit 14. In actual, since the repeater unit #1 (11-1) is not on the data bus #2 (12-2), the control unit 15 transmits the frame for the bridging unit 14, instead of the repeater unit #1 (11-1).

Then, the control unit 15 changes the connection destination of the repeater unit #1 (11-1) from the data bus #1 (12-1) to the data bus #2 (12-2) (refer to FIG. 17(*d*)).

The control unit 15 releases the access rights of the data buses #1 (12-1) to #2 (12-2) (refer to FIG. 17(*e*)). This feature allows the repeater units #1 (11-1) to #4 (11-4) can access the data buses #1 (12-1) and #2 (12-2).

After the control unit 15 halts the access right to the repeater unit 11-i that changes the connection of the data bus, it transmits data that changes the connection of the data bus to the bridging unit 14 using the upper layer, instead of the repeater unit 11-i that changes the connection of the data bus. Thus, the information regarding the connection of the bridging unit 14 is updated. Thereafter, the control unit 15 connects the repeater unit 11-i to the data bus after the changing operation. Therefore, like the method 2-2, the method of changing the setting information of the interbus connecting unit (bridging unit 14) can be obtained, together with (1) an internal bus load recognizing method or (2) a suitable bus connecting method for each module to reduce the bus load. This approach allows the internal configuration or module configuration to be reduced (distributed) the device load.

In the embodiment described above, the number in use of the repeater unit, the bridging unit, and the data bus can be changed to a desired value.

In the embodiment, the present invention can be realized using a smart HUB. In addition, the present invention can be realized by using bridges, routers, and brouters for a LAN.

What is claimed is:

1. A bus load distributing method suitable for data communications equipment, said data communications equipment including plural modules, plural buses, bus connecting means for interconnecting said plural buses, and control means for controlling connections between said plural modules and said plural buses so as to connect selectively and physically said plural modules to one bus among said plural buses, to perform data communications between said plural modules via said plural buses and to control a load on each of said plural buses, the method comprising the steps of:

switching said bus among said plural buses to be connected to a concerned module by said control means in accordance with a traffic of each of said plural modules to minimize the load associated with said bus, wherein said control means counts an amount of data transmitted from each of said plural modules to said plural buses, and switches the concerned module to said bus to be connected, based on information regarding said amount of data.

2. A bus load distributing method suitable for data communications equipment according to claim 1, wherein said control means counts by address the amount of data transmitted from each of said modules to said plural buses, and switches a concerned module to a bus to be connected, based on information regarding said amount of data counted by address.

3. A bus load distributing method suitable for data communications equipment according to claim 2, further comprising the steps of:

calculating roughly the traffic on each of said plural buses, based on the result obtained by counting the amount of data by address, said data being transmitted from each module via said bus in said data communications equipment; and reducing the load on each of said plural buses, based on the result obtained by roughly calculating a traffic after said bus has been switched, said control means instructing each module of a changing aspect between said bus and each module.

4. A bus load distributing method suitable for data communications equipment according to claim 1, further comprising the steps of:

monitoring a traffic passing through said bus connecting means;

informing said control means that there is a large amount of traffic between specific modules via a different bus; and changing a configuration of said modules.

5. A bus load distributing method suitable for data communications equipment according to claim 1, further comprising the steps of:

halting a bus access right of a module, a connection to a respective bus of which is to be changed, by said control means;

rewriting connection information regarding said bus connecting means into information indicative of a selected bus after a bus connection of the concerned module has been changed; and connecting said module to a bus established after the bus connection has been changed.

6. A bus switching control device for data communications equipment including plural modules, plural buses arranged in parallel to perform data communications between said plural modules, and a control device for selectively and physically connecting each module to one bus among said plural buses, the device comprising:

bus switching control means for selecting a bus to be connected among said plural buses in accordance with a traffic of each of said modules and switching to said selected bus, to optimize a load on said buses;

said bus switching control means including counting means for counting an amount of data transmitted from each module to said bus, and bus switching means for switching a bus to a concerned module, based on data amount information from said counting means, wherein said counting means is configured for counting the amount of data transmitted from each module via said bus every each address; and said bus switching means is configured for switching a bus to the concerned module, based on the data amount counted by address by said counting means.

7. A bus switching control device for data communications equipment, according to claim 6, wherein said bus switching control means further includes:

trial traffic calculating means for roughly calculating a traffic on each of said buses, based on a count result from said counting means; and changing aspect instructing means for instructing each module of a changing aspect to reduce a load associated with a bus, based on a traffic result obtained by said trial traffic calculating means.

8. A bus switching control device for data communications equipment including plural modules, plural buses arranged in parallel to perform data communications between said plural modules, and a control device for selectively and physically connecting each nodule to one bus among said plural buses, the device comprising:

bus switching control means for selecting a bus to be connected among said plural buses in accordance with a traffic of each of said modules and switching to said selected bus, to optimize a load on said buses;

said bus switching control means including counting means for counting an amount of data transmitted from each module to said bus, and bus switching means for switching a bus to a concerned module, based on data amount information from said counting means, wherein said bus switching control means switches a configuration of said modules in response to information indicating that a traffic on a different bus between specific modules is heavy.

9. A bus switching control device for data communications equipment including plural modules, plural buses arranged in parallel to perform data communications between said plural modules, and a control device for selectively and physically connecting each module to one bus among said plural buses, the device comprising:

bus switching control means for selecting a bus to be connected among said plural buses in accordance with a traffic of each of said modules and switching to said selected bus, to optimize a load on said buses;

said bus switching control means including counting means for counting an amount of data transmitted from each module to said bus, and bus switching means for switching a bus to a concerned module, based on data amount information from said counting means, wherein said bus switching control means further comprises:

access right inhibiting means for inhibiting a bus access right of a module, a bus connection of which has been changed; and means for connecting said module to a bus established after a switching operation, by instructing to rewrite information regarding bus connection into information established after a bus connection switching operation, using bus connecting means which interconnect said plural buses.

10. A bus load distributing method suitable for data communications equipment including plural repeater means, plural buses, bridging means in a local area network for interconnecting said plural buses, and control means for controlling connections between said plural repeater means and said plural buses so as to connect selectively and physically each repeater means to one bus among said plural buses, to establish data communications between said plural repeater means via said plural buses and to control load to said plural buses, the method comprising the steps of halting by said control means a bus access right of a repeater means, a bus connection of which has been changed, and transmitting, after said halting step, by said control means data to said bridging means using one of communication protocol layers, the data being used for updating a setting information of said bridging means, to said bridging means, and then connecting by said control means said repeater means to a bus established after a bus connection information for said bridging means has been changed.

11. A bus switching control device for data communications equipment including plural modules, plural buses connected to said plural modules and arranged in parallel to perform data communications between said plural modules, and a control device for selectively and physically connecting each module to one bus among said plural buses, the device comprising:

bus switching control means for selecting a bus to be connected among said plural buses in accordance with a traffic of each of said modules and switching to said selected bus, to optimize a load on said buses;

said bus switching control means including counting means for counting an amount of data transmitted from each module to said selected bus, and bus switching means for switching a bus to a concerned module, based on data amount information from said counting means.

* * * * *